C. J. KNAPP.
COLLAPSING TAP.
APPLICATION FILED MAY 15, 1918.
1,304,574.
Patented May 27, 1919.
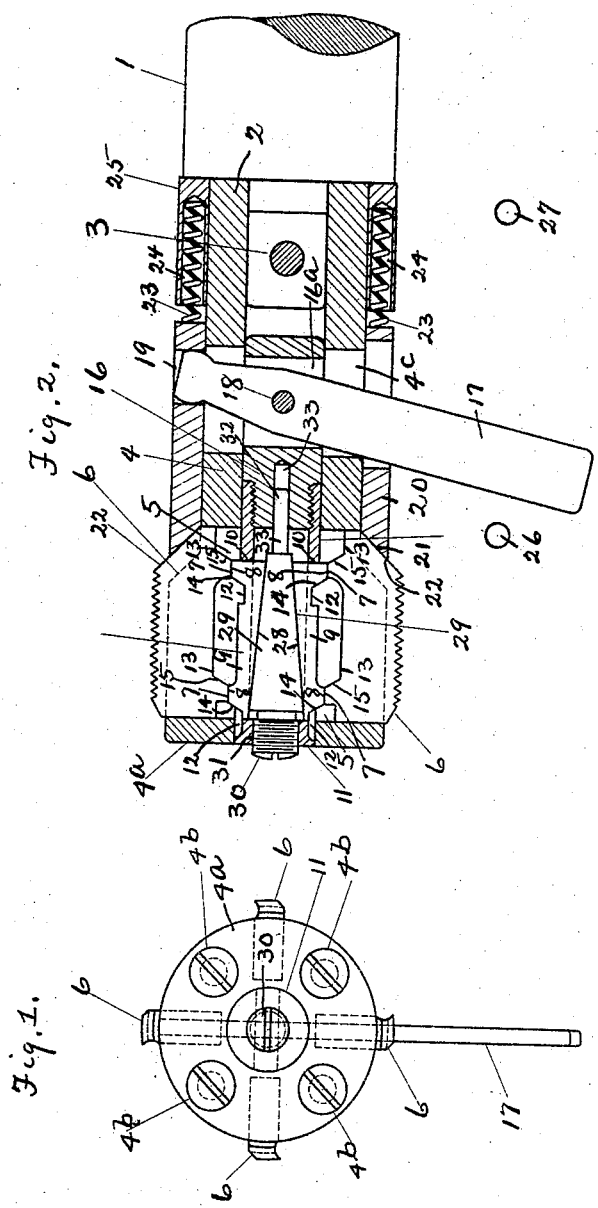
Inventor.
Charles J. Knapp
By
Attorney

UNITED STATES PATENT OFFICE.

CHARLES J. KNAPP, OF ERIE, PENNSYLVANIA, ASSIGNOR TO MODERN TOOL COMPANY, OF ERIE, PENNSYLVANIA, A CORPORATION OF PENNSYLVANIA.

COLLAPSING TAP.

1,304,574.

Specification of Letters Patent.

Patented May 27, 1919.

Application filed May 15, 1918. Serial No. 234,706.

*To all whom it may concern:*

Be it known that I, CHARLES J. KNAPP, a citizen of the United States, residing at Erie, in the county of Erie and State of Pennsylvania, have invented new and useful Improvements in Collapsing Taps, of which the following is a specification.

This invention relates to collapsing taps and consists in certain improvements in the construction thereof as will be hereinafter fully described and pointed out in the claims.

The invention is illustrated in the accompanying drawings as follows:—

Figure 1 is an end view of the tap.

Fig. 2 a central longitudinal section of the same.

1 marks the shank. This has the extension 2 on which the head 4 is secured by the pin 3. The head has the radial slots 5 in which the chasers 6 are mounted. The slots are closed at the end by the plate 4ª. The plate is secured to the head by the screws 4ᵇ.

The chasers have the holding surfaces 7 which rest on the holding surfaces 8 on the cam and holding blocks 9. The cam and holding blocks are mounted in radial slots 10 in the carrier 11. The blocks have depressions 12 and the chasers the depressions 13 into which the surfaces 7 and 8 may move to collapse the tap when the surfaces 7 and 8 are moved out of register. The blocks are provided with the cam surfaces 14 and the chaser with the cam surfaces 15. The cams 14 acting on the cams 15 when moved by the carrier expand the chasers.

The carrier has the extension 16. The lever 17 extends through a transverse slot 4ᶜ in the head, slot 16ª in the extension and into a slot 19 in the sleeve 20. The lever is secured to the extension 16 by a pin 18.

The sleeve 20 has an annular cam surface 21 at its front end engaging cam surfaces 22 on the chasers. The sleeve is pressed forward by the springs 23. The springs are arranged in the pockets 24 in a sleeve 25 on the head. The sleeve 20 not only holds the chasers in the slots but also forms a positive means for retracting them, the springs 23 tending to effect this result but the lever 17 forcibly accomplishing it. This is important especially when the tap is used on automatic machines as the failure to collapse on such machines results in serious damage. The pins 26 and 27 arranged in the path of the lever 17 will automatically actuate the tap when the head is mounted in an automatic machine and the action of the lever 17 arrested by the post 26 will forcibly move the sleeve 20 to collapse the tap.

The chasers are adjusted by adjusting the blocks 9. These rest on the tapered plug 29, the blocks having the surfaces 28 to conform to the taper. The screw 30 is arranged on the end of the plug and is screwed into the threaded opening 31 in the end of the carrier 11. The pin 32 extends from the plug into a socket 33 thus centering the plug.

The operation of the tap is as follows: As shown the chasers are expanded. By moving the lever 17 the carrier is moved carrying the blocks from under the chaser. This permits the surfaces 7 and 8 to move into the depressions 12 and 13. The chasers are forced inwardly by the cam action of the sleeve 20. The spring 23 snaps them to collapsed position ordinarily as soon as the surfaces 7 are off the surfaces 8. If, however, the springs do not accomplish this the lever 17 acting on the sleeve forces the chasers to their collapsed position. To expand the chaser the lever is moved forcing the carrier to the left. This moves the blocks 9 and the cams 14 acting on the cams 15 expand the chasers.

The lever may be actuated manually or automatically as occasion requires. It may be desirable to effect the collapsing of the tap by pressure at the end of the tap. This may be effected by making the length of the screw 30 such as to contact the bottom of a hole as desired. Pressure on this screw as the tap advances moves the carrier and permits the collapsing of the tap.

The plural surface cams 7 and 8 permit of sharper cams at widely separated points and consequently quicker and more even movement. The adjustment by means of the tapered plug assures a very minute and uniform adjustment of each chaser. When used with an automatic machine the collapsing is positively effected by the forward movement of the tap through the action of the lever. With this construction a positive release is effected.

What I claim as new is:—

1. In a collapsing tap, the combination of a head; a radially movable cutter mounted in the head; a cam acting directly and by axial movement on said cutter to retract it;

and means acting positively by a forward movement of the head for actuating the cam to retract the cutter.

2. In a collapsing tap, the combination of a head; a radially movable cutter mounted in the head; and a sleeve slidingly mounted on the head and having an internal cam surface actuating by direct engagement and axial movement of the sleeve on the outer ends of the cutter.

3. In a collapsing tap, the combination of a head; radially movable cutters mounted in the head; and a sleeve slidingly mounted on the head and having an annular internal cam surface directly engaging the cutters for retracting them.

4. In a collapsing tap, the combination of a head; a radially movable cutter mounted in the head; and a sleeve slidingly mounted on the head and having an internal cam surface directly engaging the cutter to retain the cutter in the head and to actuate the cutter to retract it.

5. In a collapsing tap, the combination of a head having a transverse slot and radial slots therein; cutters mounted in the radial slots; a sleeve on the head having an undercut surface engaging the cutters; devices for expanding the cutters; and a lever extending into said transverse slot and secured to said devices and sleeve whereby said devices and sleeve may be actuated by said lever.

6. In a collapsing tap, the combination of a head; radially movable cutters mounted in the head; holding blocks for holding the cutters in expanded position; and means movable to adjust the blocks radially to adjust the cutters.

7. In a collapsing tap, the combination of a head; radially movable cutters mounted in the head; holding blocks for holding the cutters in expanded position; a taper plug within the blocks and adapted to adjust them radially; and a screw for adjusting the plug axially.

8. In a collapsing tap, the combination of a head; radially movable cutters mounted in the head having holding and cam surfaces on the inner faces thereof; holding and cam blocks having holding and cam surfaces engaging the holding and cam surfaces on the cutters; a carrier for said blocks; and means for actuating the carrier.

9. In a collapsing tap, the combination of a head; radially movable cutters mounted in the head having holding and cam surfaces on their inner faces; holding and cam blocks having holding and cam surfaces engaging the holding and cam surfaces on the cutters; a carrier in which said blocks are mounted and in which they are radially movable; means for adjusting the blocks to adjust the cutters; and means for actuating the carrier.

10. In a collapsing tap, the combination of a head; radially movable cutters mounted in the head having holding and cam surfaces on their inner faces; holding and cam blocks having holding and cam surfaces engaging the holding and cam surfaces on the cutters; a carrier in which the blocks are mounted and in which they are radially movable; a taper plug within the carrier for adjusting the blocks; and means for actuating the carrier.

11. In a collapsing tap, the combination of a head having a transverse slot and radial slots therein; cutters mounted in the radial slots having cam and holding surfaces on their inner faces; cam and holding blocks having cam and holding surfaces engaging the cam and holding surfaces on the cutters; a carrier mounted in the head and having radial slots in which the blocks are mounted; a taper plug in the carrier engaging the blocks for adjusting the blocks; a screw for adjusting the plug; a sleeve on the head having an undercut surface engaging the cutters for holding them in their slots and positively retracting them; a lever extending to the transverse slot in the head and actuating the carrier and sleeve to expand and retract the cutters; a second sleeve on the head having spring sockets; and springs in the sockets exerting pressure on the first-named sleeve.

In testimony whereof I have hereunto set my hand.

CHARLES J. KNAPP.

Copies of this patent may be obtained for five cents each, by addressing the "Commissioner of Patents, Washington, D. C."